3,440,165
WASTE TREATMENT PROCESS WITH RECYCLING OF LIME

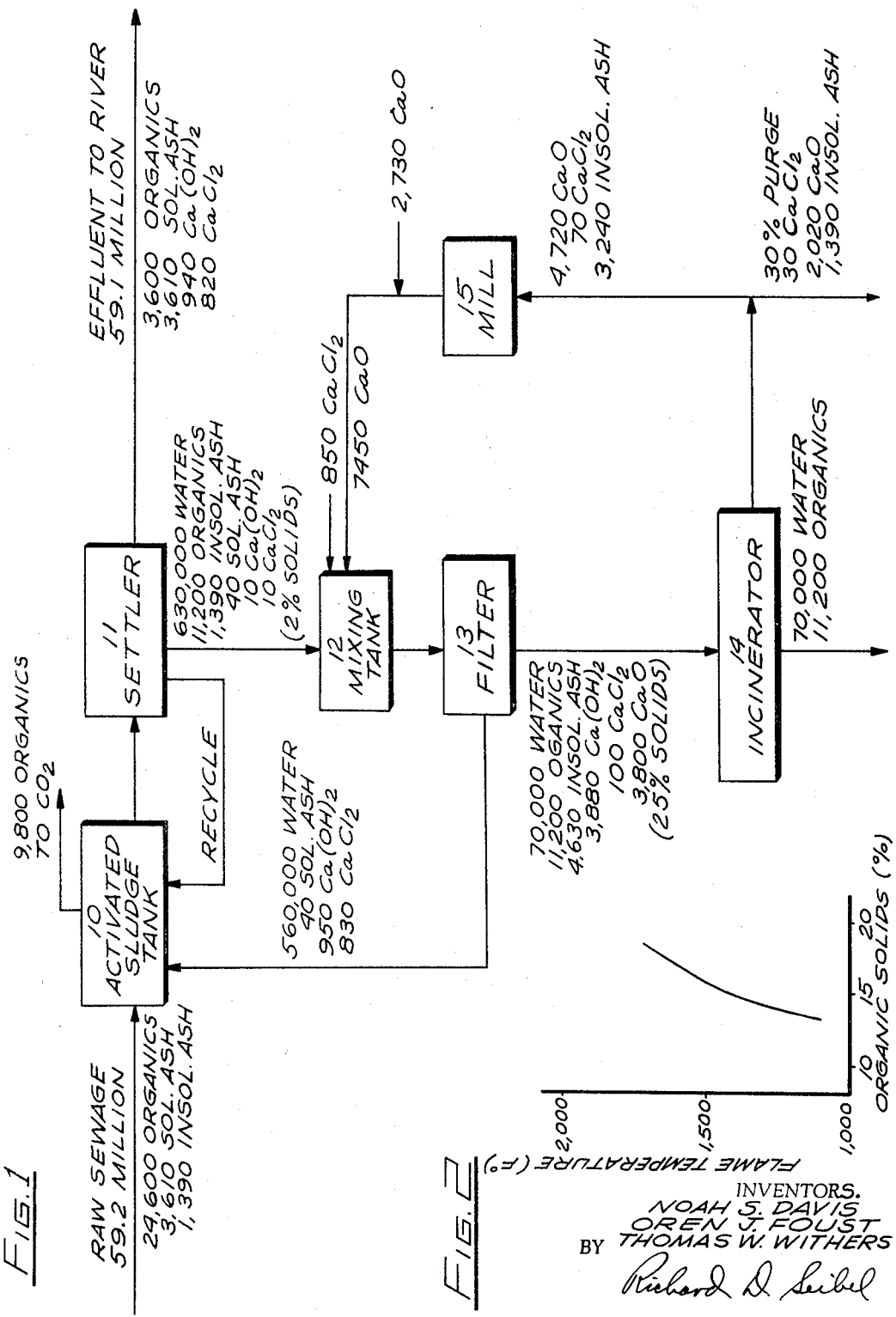

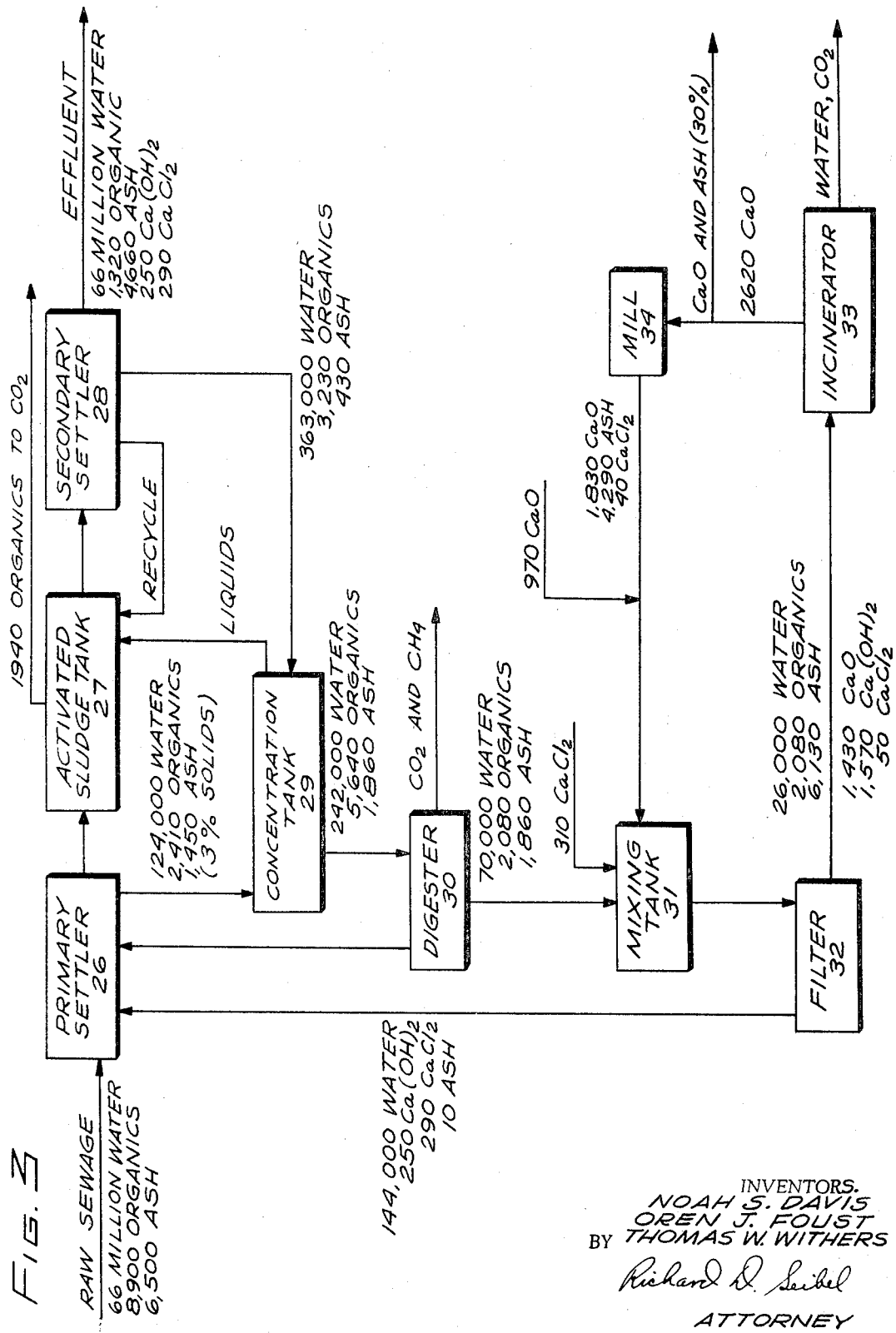

Noah S. Davis, Northridge, Oren J. Foust, Granada Hills, and Thomas W. Withers, Sepulveda, Calif., assignors to North American Rockwell Corporation, a corporation of Delaware
Filed June 13, 1967, Ser. No. 645,818
Int. Cl. C02c 1/06
U.S. Cl. 210—4                                   13 Claims

ABSTRACT OF THE DISCLOSURE

A process is described for treatment of sewage wherein activated sludge is produced which may be treated directly or may be digested in a second embodiment before further treatment. The sludge is thereafter flocculated by sequential additions of calcium chloride and hydrated calcium oxide. The flocculated sludge is filtered to remove water from the solids and the filter cake is incinerated at a temperature sufficient to calcine the calcium compounds therein to calcium oxide. Calcium oxide in the solid product of the incinerator is ground and recycled to provide hydrated calcium oxide for inducing flocculation thereby substantially reducing the cost of operation.

Background

In the treatment of industrial or municipal sewage one of the principal problems is the disposition of sludge. In a typical sewage treatment process solids are separated and dissolved material is reduced by growing solid microorganisms as either activated sludge or digested sludge, all of which must be disposed of in some way. Typical dispositions of sludge include use as land fill or drying for fertilizer. These have been found to have limited applicability and much sewage sludge is disposed of by oxidation to reduce its volume. The oxidation may be in solution in a so-called Zimmerman process or the sludge may be burned in air to remove the organic materials. The resultant ash and incombustible solids are normally disposed of as land fill.

In order to incinerate or burn the organic materials in the sludge it is first necessary to eliminate water therefrom. The principal portion of the water is removed by flocculating, settling, and filtering the sludge for producing a relatively dry filter cake. The filter cake is then incinerated in roasters or furnaces that evaporate the water in the first stages thereof and burn the organic solids in later, higher temperature regions thereof. If the quantity of organic solids contained in the sludge is too low to support combustion at a temperature of at least 1400° F. it is necessary to add auxiliary fuel to the furnace in order to minimize malodorous products.

It is therefore desirable to produce a filter cake having a relatively high content of organic solids or low water content for minimizing the heat load required for evaporation of the water and for producing a high flame temperature.

In order to produce a reasonably dry filter cake with appreciable yields it is practice in the industry to flocculate the sludge prior to filtration. The standard in the industry is flocculation with ferric chloride and lime. These materials accumulate as insoluble calcium hydroxide and ferric hydroxide and are disposed of as land fill. The cost of ferric chloride and lime is a substantial factor in the cost of sewage disposal.

Other processes for treating waste materials involving improved flocculation and employing other chemicals and involving other suspensions are described in copending U.S. patent applications, Ser. No. 645,817, entitled "Waste Treatment Process with Recycling of Flocculating Agents," by Noah S. Davis and Oren J. Foust; Ser. No. 645,816, entitled, "Flocculation of Suspensions," by Noah S. Davis and Oren J. Foust; and Ser. No. 645,-821, entitled, "Combined Waste Treatment and Cement Making Method and Means," by Noah S. Davis.

Summary of the invention

Thus there is provided in the practice of this invention according to a preferred embodiment a process for flocculating sludge by sequential additions of calcium chloride and hydrated calcium oxide and recovery of calcium oxide from the flocculated solids for providing economical sewage treatment. Incineration of separated solids produces calcium oxide from the calcium compounds in the solids and this material is at least partly recycled for flocculation of the sludge.

Objects and many of the attendant advantages of this invention will be understood by reference to the following detailed description when considered in conjunction with the accompanying drawings wherein:

FIG. 1 illustrates a flow diagram of a sewage treatment process incorporating the principles of this invention;

FIG. 2 comprises a graph of flame temperature versus percent solids for incinerating sludge; and FIG. 3 comprises a flow diagram of another sewage treatment process incorporating the principles of this invention.

FIG. 1 illustrates a flow diagram for waste treatment process incorporating the principles of this invention. Broadly the process described in detail hereinafter and illustrated by the diagram of FIG. 1 comprises conversion of raw sewage to activated sludge by aerobic bacteria in a tank 10. The sludge is separated in a settler 11 and clarified effluent water is discharged from the system. Calcium chloride and hydrated calcium oxide are sequentially added to the sludge in a tank 12 and substantially instantaneous flocculation of solids occurs. The flocculated sludge is filtered in a vacuum filter 13 and the filter cake is burned in an incinerator 14 for removing organics and also converting calcium compounds in the sludge to calcium oxide. A portion of the incinerator product is purged or discarded and the balance is ground in a mill 15 and recycled to the tank 12 to supply calcium oxide for causing flocculation.

Thus as illustrated in FIG. 1, raw sewage is fed to an activated sludge tank 10 which is a conventional aeration tank as is widely used in conventional sewage treatment plants. In the activated sludge tank 10 microorganisms, principally bacteria, convert most of the soluble organic material to bacterial cells and carbon dioxide. The microorganisms may also flocculate any fine particles of solids present in the sewage.

As illustrated in FIG. 1, about 59.2 million pounds per hour of raw sewage is fed into the activated sludge tank 10. The raw sewage is principally water containing about 24,600 pounds per hour of dissolved and suspended organic material, about 3,610 pounds of soluble ash, and about 1,390 pounds of insoluble ash. Ash, for the purposes of discussion herein, comprises mineral matter such as the inherent hardness of the water, silt and the like in the sewage, and dissolved chemicals which are not organically decomposed in the activated sludge system.

Throughout FIG. 1 and other figures presented hereinafter in this description, the quantities of materials are stated in pounds per hour (sometimes merely stated as pounds) and these flow rates have been rounded off to the nearest 10 pounds per hour or to three significant figures which may lead to minor discrepancies in absolute balance of the flow diagrams. It should be recognized, of course, that the values set forth for flow rates are typical of a particular sewage composition and treatment processes and that substantial variation in the quantities may occur in practice of this invention on other waste products and within the range of chemical additives found operable. It will also be apparent that many conventional pumps, weirs, valves and the like are employed in carrying out a process as herein described and these have been omitted from the detailed description. Likewise it will be recognized that control of the process may be manual or preferably may be automatic.

The sewage flowing into the system of FIG. 1 is relatively "rich" and is relatively high in organic content and low in ash content. Such a sewage is typical of that obtained from industrial plants such as paper mills, abattoirs and the like. Of the 24,600 pounds per hour of organics entering the system in the raw sewage about 9,800 pounds are converted to carbon dioxide by the microorganisms in the activated sludge tank 10. The $CO_2$ escapes from the activated sludge to the atmosphere. The activated sludge produced in the activated sludge tank 10 is passed to a settler 11. In the settler 11 the flocculated fine particles and the microorganisms settle out to form a slurry having up to about 3% solids. The relatively clear supernatent liquid from the settler has a sufficiently low biological oxygen demand (BOD) to be discharged as plant effluent to a receiving body of water such as a river, lake or ocean. In the embodiment illustrated in FIG. 1, the effluent from the plant comprises about 59.1 million pounds per hour, principally water, containing about 3,600 pounds of organics, 3,610 pounds of soluble ash, 940 pounds of calcium hydroxide, and 820 pounds of calcium chloride, the latter two of which are introduced into the system as hereinafter described.

A portion of the slurry from the settler, usually as much as 15 million pounds per hour, is recycled to the activated sludge tank to maintain a very high cell concentration of microorganisms so that the residence time in the aeration tank 10 for sewage treatment is relatively short.

A portion of the acitvated sludge is removed from the settler and disposed of. If desired, a second stage of settling or concentration may be employed to increase the solids content of the separated sludge. Preferably the settled sludge slurry contains anywhere from about 0.75 to 3% solids. This presents a considerable disposal problem in conventional plants because of the high water content and the inherent difficulty of filtering activated sludge. The sludge had previously been disposed of as land fill or dried for fertilizer or oxidized to dispose of all of the organic materials. Both land filling and manufacture of fertilizers have limited applicability and oxidation is becoming increasingly attractive.

One technique for oxidation that has been conducted in the past is a so-called Zimmerman process, comprising heating the wet sludge to elevated temperaures under elevated pressure to increase the oxidation rate. Such a process has proved practical only on very large scale operations and in certain selected special situations because of the very high capital costs involved. An alternative technique for disposing of activated sludge is to filter the sludge and incinerate it at a temperature sufficient to oxidize the organic materials without producing objectionable odorous products.

Because of the very high water content of the slurry from the settler, incineration is impractical without further drying thereof. Typically, such a material can be filtered to increase the solids content in the form of a filter cake; however, as mentioned hereinabove, the activated sludge is a difficult material to filter without additional treatment. It is, therefore, conventional practice to add flocculating agents to activated sludge to provide a more readily filterable suspension. Previously, complex organic flocculating agents have been employed or combinations of ferric chloride and lime have been used. Reasonably economical operation of sewage treatment plants has been obtained with such flocculating agents. However, it is found that substantially more economical operation is obtained with processes as provided in practice of this invention.

In the embodiment of FIG. 1, the slurry from the settler typically comprises 630,000 pounds per hour of water containing 11,200 pounds per hour of organics, 1,390 pounds per hour of insoluble ash, 40 pounds per hour of soluble ash, and 10 pounds per hour each, of calcium hydroxide and calcium chloride in solution. This activated sludge slurry is passed to a mixing tank 12 which may comprise a mechanically stirred or air-lift type mixer, preferably in two separate chambers, or may comprise merely a channel or conduit subject to turbulent flow. Into the mixing tank with the sludge is first added about 850 pounds per hour of calcium chloride which is preferably in the form of a solution of about 250 grams of calcium chloride per liter of solution. At least about one-half to three minutes should be allowed for mixing of the calcium chloride in the slurry. Thereafter, about 7,450 pounds per hour of calcium oxide is added to the slurry in tank 12 and substantially instantaneous flocculation occurs upon addition of the calcium oxide.

The flocculation of the solid material in the sludge is caused by the sequential additions of calcium chloride and calcium oxide. Premixing of these materials or concurrent addition is substantially ineffective for inducing rapid flocculation.

The calcium oxide is preferably hydrated or slaked prior to adding to the sludge, however, fine calcium oxide powder mixed directly into the slurry hydrates almost instantly. It is preferred to substantially completely mix the slaked lime with the sludge within about one minute and it is preferred to pass the flocculated material quickly to a conventional vacuum filter 13 for rapid removal of water. It is found that satisfactory results are obtained when the time between flocculation and filtration is within the range of about 1 minute to about 30 minutes.

The filter 13 removes about 560,000 pounds per hour of water containing in solution about 40 pounds of soluble ash, 950 pounds of calcium hydroxide and 830 pounds of calcium chloride. In addition, the filter 13 produces a relatively dry filter cake which may run from about 20 to 25% total solids. A typical filter cake, as illustrated in FIG. 1, comprises about 70,000 pounds per hour of water; 11,200 pounds of organics; about 4,630 pounds insoluble ash; about 3,880 pounds calcium hydroxide; 100 pounds per hour calcium chloride; and 3,800 pounds of calcium oxide.

The filter cake is fed to a conventional multiple hearth roaster or Herreschoff type furnace 14 wherein it is heated to at least 1400° F. in order to oxidize the organic materials without production of odorous products. It will be apparent that rotary kilns and the like can also be used for incineration of the filter cake. The first few hearths of the roaster serve principally to dry the filter cake and further into the incinerator, autogenous combustion of the organic material occurs with consequent production of heat. If necessary, in order to reach sufficiently high temperatures, additional fuels such as gas or oil can be employed in the incinerator as is conventional practice. The incinerator extracts from the filter cake about 70,000 pounds per hour of water and about 11,200 pounds per hour of organic material which are discharged in the flue gases in the form of water vapor and carbon dioxide. In addition, a solid ash is produced comprising principally calcium oxide which is calcined from the calcium hydroxide in the filter cake. A substantial amount of insoluble ash is also present in the solid product of the incinerator, intimately mixed with the calcium oxides as clinkers or powder.

In the embodiment of FIG. 1 about 30% of the incinerator solid product is purged or discarded by simply diverting a portion to land fill or the like. This amounts to about 2,020 pounds per hour of calcium oxide, intermixed with 1,390 pounds per hour of insoluble ash, and about 30 pounds per hour of calcium chloride that is removed and discarded. Such a purge is necessary in a system involving recycling to eliminate the ash coming into the system in the raw sewage. The percentage purge can be varied to control the quantity of ash being recycled with calcium oxide.

The balance (for example, 70%) of the solid product of the roaster 14 is passed to a conventional grinding mill 15 such as a ball or rod mill for comminuting the calcined lime. The finely ground product, which includes about 4,720 pounds per hour of calcium oxide is fed back into the mixing tank 12 in order to induce flocculation as hereinabove described. Since a portion of the calcium oxide is purged from the system continuously, an additional 2,730 pounds of calcium oxide is added to the mixing tank as makeup. In addition to the calcium oxide removed from the system as part of the purge, additional calcium oxide is lost from the waste treatment plant in the form of calcium hydroxide dissolved in the liquid effluent from the settler 11.

In addition to the calcium oxide contained in the solid material recycled from the mill 15 to the mixing tank 12 there is about 3,240 pounds of insoluble ash which does not enhance flocculation of the activated sludge. The insoluble ash, is however, substantially beneficial to the filtering by providing readily filterable solid particles acting as a "filter aid" in a manner as is well known to those skilled in the art.

The organic solid fed to the incinerator have a heat of combustion of about 11,000 B.t.u. per pound which is sufficient to provide most, if not all, of the heat required for combustion in the incinerator. The stable flame temperature achieved in the incinerator is highly dependent on the moisture content of the filter cake fed thereto, in the absence of auxiliary fuel. FIG. 2 comprises a plot of flame temperature in a multiple hearth incinerator against the percentage of organic solids in the filter cake on an ash-free basis. The minimum temperature for flame stability is about 1100° F. and it is preferred in burning activated sludge filter cake to achieve a temperature of at least 1400° F. to avoid odor problems due to incomplete combustion of the last traces of organic material. These temperatures are sufficient to calcine the lime present since the reaction of calcium hydroxide to form calcium oxide occurs as low as 1085° F. The decomposition of calcium carbonate to calcium oxide occurs about 1520° F. and, if substantial amounts of this material are present, due to combustion with carbon dioxide, it is preferred that the flame temperature be at least this high.

As can be seen from FIG. 2, the flame temperature achieved is highly sensitive to small variations in the organic solids content of the filter cake fed to the incinerator. When the percentage of organic solids in the filter cake is above about 13.5 the heat of combustion thereof is sufficient to maintain a flame of at least 1100° F. In order to maintain a flame temperature of 1400° F. without addition of auxiliary fuel an organic solid content of about 15.5 percent is required. When the organic solid content of the filter is higher than this value no auxiliary fuel is required in the incinerator and highly economical operation results. Since a change in organic solid content of as little as 1% can make a difference in flame temperature of about 150° F. it is readily apparent that relatively small improvements in filter cake dryness may lead to very substantial economic advantages.

As mentioned hereinabove, one of the standard techniques for flocculation of activated sludge comprises additions of ferric chloride and lime to cause flocculation. In order to ascertain the characteristics of a process of sequentially adding calcium chloride and hydrated calcium oxide to activated sludge, the filtration characteristics were compared with the standard ferric chloride-lime process. Measurements were made of the filtration rate, that is, the quantity of material filtered per unit area and of the dryness of the filter cake achieved. No substantial difference was noted in the filtration rate for activated sludge and the process described herein is comparable to the standard flocculant, ferric chloride plus lime, in this characteristic.

It was found, however, that improved dryness is obtained in the filter cake employing sequential additions of calcium chloride and calcium oxide to the activated sludge. Appreciably improved settling characteristics were also found with additions of calcium chloride and lime as compared with ferric chloride and lime. This property is of appreciable significance if an elutriation step is employed. Elutriation is sometimes employed between the flocculation in the mixing tank and the vacuum filtration and involves removal of relatively clear supernatent from settled sludge and addition of fresh water thereto in order to reduce the concentration of interfering chemicals in the filtration step. The effluent from an elutriation step, if employed, is recycled to the activated sludge tank.

In order to achieve filter cake drynesses comparable to or better than the standard ferric chloride and lime additions, it is preferred to employ somewhat larger quantities of flocculating additions. However, since calcium chloride is substantially less expensive than ferric chloride, larger quantities are economically employed to give improved filtration properties.

In addition to the economies resulting from the somewhat drier filter cake obtained using sequential additions of calcium chloride and calcium oxide, further economies are obtained by recycling calcium oxide after incineration. The calcium compounds in the filter cake are calcined to calcium oxide in the incinerator and as much as 70% is recycled in the system, thereby resulting in substantial reductions in the cost of chemical additives. Thus, in the system described and illustrated in FIG. 1, 70% of the calcium oxide is recycled with consequent reduction in material cost. The only added cost is that of milling the incinerator product in a ball mill or the like, and this is a relatively inexpensive operation since, at worst, a weak sinter is obtained from a hearth roaster and a fine powder often results.

It has been found that variations can be made in quantities of calcium chloride and hydrated calcium oxide added to the achieved sludge in order to induce flocculation. The quantity of calcium chloride is preferably in the range of from about 5 to 40 pounds of calcium chloride per thousand gallons of sludge for each percent of solids suspended therein. Thus, for example, if 1,000 gallons (about 8,340 pounds) of sludge having 1.5% solids were being treated, the quantity of calcium chloride added would preferably be in the range of from 7.5 to 60 pounds. If the calcium chloride is less than about 5 pounds per thousand gallons per percent of solids, the flocculation is noticeably poorer and a lower filtration rate is obtained. It is preferred that the addition of calcium chloride be less than about 40 pounds per thousand gallons of sludge per percent of solids since the increased flocculation obtained thereafter is not sufficient to justify additional use of this more expensive chemical. It should be noted that even at this higher limit, the cost is less than for an equally effective amount of ferric chloride.

It is preferred that the hydrated calcium oxide be added to the activated sludge sequentially after the calcium chloride and in the range of from about 30 to 200 pounds per thousand gallons of sludge for each percent of solids suspended therein. Additions of less than about 30 pounds of calcium oxide per thousand gallons are relatively less effective in causing flocculation and the filtration characteristics of the sludge are diminished. When more than about 200 pounds of calcium oxide is added per thousand gallons of sludge no significant change in flocculation characteristics is noted and any additional materials are present merely as filter aids. In general, the higher the amount of addition agents made to the sludge and also the higher the concentration of addition agents in the solutions added, the better is the flocculation. It is also preferred that the flocculation be conducted with a pH in the range of from about 6 to 12.5 and in general, it is found that the higher the pH, up to about 11, the better is the filtration.

FIG. 3 illustrates another embodiment of waste treatment process incorporating the principles of this invention. As provided therein in a manner quite similar to that hereinabove described, raw sewage is separated in a primary settler 26 with liquids passing to an activated sludge tank 27 where a substantial quality of the organic material is converted to carbon dioxide and microbial cell material. The activated sludge is concentrated in a secondary settler 28 and the clear effluent therefrom is discharged from the treatment plant. A portion of the slurry from the secondary settler 28 is cycled to a concentration tank 29. The primary sludge from the primary settler 26 is also passed to the concentration tank 29 for producing a slurry having about 3% solids. Relatively clear effluent from the concentration tank 29 is recycled to the activated sludge tank 27 or primary settler 26.

The slurry from the concentration tank 29 is passed to a conventional digester 30 where the aerobic organisms, principally bacteria, in the activated sludge die and are decomposed, along with a portion of the soluble organic matter, to methane and carbon dioxide by anaerobic bacteria. Since a substantial quantity of the organic material, usually from about one-half to two-thirds, is converted to carbon dioxide and methane in the digester, the quantity of material to be further disposed of is substantially reduced. In addition, the filterability of digested sludge is substantially better than the filterability of activated sludge with both higher filtration rates and higher concentrations of solids in the filter cake. In addition, one of the produces of digestion is methane which is readily employed elsewhere in the waste treatment facility for power generation or heating or for providing auxiliary fuel to an incinerator, if required.

Thus, in a typical embodiment as illustrated in FIG. 3, about 66 million pounds of raw sewage per hour (about 7.9 million gallons) enters the system, which is typical of the quantity of municipal waste from a moderate size city. Such a quantity of a typical municipal sewage contains about 8,900 pounds per hour of organic materials in solution and suspension, and about 6,500 pounds per hour of ash. The raw sewage is usually substantially different from industrial sewage in that the concentration of organics is considerably lower and the ash concentration may be substantially higher. Industrial sewage is not diluted to the extent that municipal sewage is and hence has a higher organic content. Municipal sewage usually contains substantial quantities of ash due to infusion of silt into sanitary sewers or combining of storm water with sanitary sewage.

In a municipal system the raw sewage is normally first processed in a primary settler 26 wherein floating debris is skimmed off and readily settleable solids are removed in the form of a slurry known as primary sludge. The liquid effluent from the primary settler 26 is transferred to an activated sludge tank 27 wherein aerobic conversion of the soluble organic materials to microbial cells is conducted substantially the same manner as hereinabove described. From the activated sludge tank 27 the activated sludge is transferred to a secondary settler 28.

The clear supernatant from the secondary settler 28 has a sufficiently low BOD to be discharged directly into a lake, river or ocean and may typically comprise nearly 66 million pounds per hour of water with 1,320 pounds per hour of organics, 4,600 pounds per hour of ash, 250 pounds per hour of calcium hydroxide, and 290 pounds per hour of calcium chloride. The secondary settler 28 produces a clear supernatant and also a thickened slurry having, for example, about 1% solids therein. The major portion of the thickened slurry is recycled to the activated sludge tank 27 to increase the microbial cell concentration therein.

In a typical embodiment a minor portion of the slurry comprising about 363,000 pounds per hour of water containing 3,230 pounds per hour of organics, and 430 pounds per hour of ash may be extracted from the secondary settler and passed to a conventional concentration tank 29 such as a Dorr thickener or the like. This increases the solids content of the activated sludge slurry to about 2% for easier handling thereafter. The balance of the liquids from the concentrator 29 are returned to the activated sludge tank or primary settler for retreatment.

The slurry of activated sludge from the concentration tank 29 is mixed with primary sludge from the primary settler 26 and the combined materials are fed into a digester 30. Thus the digester feed may comprise about 242,000 pounds per hour of water containing 5,650 pounds organics, and 1,860 pounds ash. After anaerobic digestion wherein some of the organic matter is converted to carbon dioxide and methane and some of the water may be recycled as clear effluent, the digested sludge from the digester 30 may comprise 170,000 pounds per hour of water containing 2,080 pounds per hour of organics and 1,860 pounds per hour of ash.

The digested sludge from the digester 30 is passed to a mixing tank 31 either directly as shown, or after an elutriation step. As with activated sludge, elutriation comprises displacement washing of the sludge with clear water to reduce the ash content that may interfere with flocculation. Chemical additives for inducing flocculation are sequentially added in the mixing tank 31. It is preferred to first add 310 pounds per hour of calcium chloride which is thoroughly mixed with the digested sludge, and sequentially thereafter about 2,800 pounds per hour of calcium oxide which has been hydrated as hereinabove described. These sequential additions induce flocculation in the digested sludge in the same manner as in activated sludge. In addition, in the process described and illustrated in FIG. 3, about 4,290 pounds per hour of ash is recycled into the mixing tank with recycled calcium oxide, and serves as a filter aid.

The flocculated sludge from the mixing tank 31 is filtered in a conventional vacuum filter 32 and the liquid is returned to the primary settler 26 are activated sludge tank 27. The filter also produces a filter cake comprising about 30% solids having about 26,000 pounds per hour of water; 2,080 pounds per hour of organics; 6,130 pounds per hour of ash; 1,430 pounds per hour of calcium oxide; 1,570 pounds per hour of calcium hydroxide; and 50 pounds per hour of calcium chloride. The filter cake is incinerated in a hearth type roaster or Herreshoff furnace 33 as hereinabove described. Because of the relatively lower concentration of organics in the digested sludge filter cake it is often necessary to add auxiliary fuel in the incinerator and methane from the digester 30 is usually so employed.

As in the embodiments hereinabove described, substantial amounts of calcium oxide are produced in the incinerator and it is preferred to purge about 30% of the mixed calcium oxide and ash to remove ash from the system. The other 70% of the incinerator solid product is finely ground in a ball or rod mill 34 and recycled to the mixing tank 31 for inducing flocculation and aiding filtering. Because of the calcium oxide extracted from the system in the purge and in the plant effluent an additional 970 pounds per hour of calcium oxide is preferably added to the system prior to the mixing tank as makeup.

It is found that the same range of additions of calcium chloride and calcium oxide are operable for flocculation of digested sludge as for activated sludge. It is preferred to employ an amount of additives within a higher portion of this range for activated sludge alone than for either digested sludge or activated sludge mixed with primary sludge a somewhat lower amount of additives may be usable with these latter materials because of the inherent better filterability thereof.

Thus, it is preferred to add calcium chloride in the range of from about 5 to 40 pounds of calcium chloride per thousand gallons of sludge for each percent of solids suspended therein. Likewise, it is preferred to add calcium oxide in the range of from about 30 to 200 pounds per thousand gallons of sludge for each percent of solids therein.

Application of the principles of this invention are illustrated in the following nonlimiting examples.

*Examples*

Numerous flocculation and filtering tests were conducted according to the principles of this invention. These tests were conducted on activated sludge from the Hyperion treatment plant handling municipal sewage at Los Angeles, Calif. The test material, which normally contains between one and two percent of solids, was extracted from the regular process stream after the activated sludge was concentrated by settling. The filtration tests were conducted according to conventional practice with a standard 0.1 square foot filter leaf substantially as pointed out in the Chemical Engineers' Handbook (McGraw-Hill Book Co., 4th ed., 1963, pp. 19–59).

In all of the tests a one liter sample of activated sludge was poured into a four liter beaker approximately 6 inches in diameter. The sludge was stirred with a paddle stirrer approximately 4½ inch by ¾ inch at 100 r.p.m. The additives were added as solutions or suspensions. Calcium chloride was employed in the form of a solution wherein one gram of 100% calcium chloride was made up to four milliliters of solution by addition of distilled water. Calcium oxide employed was mixed with 5 milliliters of water per gram of calcium oxide and allowed to slake for 10 minutes prior to addition to the sludge. In the cases where ferric chloride was employed one gram of 100% $FeCl_3$ was mixed with 20 milliliters of distilled water.

With the mechanical stirrer operating, the calcium chloride solution was poured into the activated sludge and allowed to mix for 15 seconds. After the 15 second mix the slaked lime, which comprises an aqueous mixture of CaO and $Ca(OH)_2$, was added to the activated sludge and stirring was continued for one minute. Filtration tests were then made without settling.

Filtration tests were made by immersing a conventional filter leaf in the suspension for a period of one minute with vacuum applied, followed by three minutes of drying or dewatering of the filter cake on the filter media. After peeling the filter cake from the filter media it was weighed and dried to provide data for the percentage of solids in the filter cake and the total yield of dry solids.

Similarly, in order to compare with standard techniques employed in the sewage treatment industry, a combination of ferric chloride and lime was employed for flocculation. These tests were conducted in the same manner as the calcium chloride and lime tests. In these tests the ferric chloride solution was poured into the activated sludge and allowed to mix for one minute with the stirrer set at 75 r.p.m. After the one minute mix the slaked lime mixture was stirred into the suspension of activated sludge for two minutes. The filration operation was conducted in the same manner as for the calcium chloride and lime tests. The ratio of CaO to $FeCl_3$ was held at four for the filtration tests since this ratio is considered in the industry to be the optimum ratio for conditioning sludge prior to filtration.

Table I presents data from a series of tests made with several samples of activated sludge and a spectrum of proportions of additives. Table I includes the percentage of solids present in the original sludge including both suspended and dissolved organics and ash. The quantities of calcium chloride and calcium oxide added by means of solution are shown in grams per liter of sludge suspension. Multiplication of this figure by 10 is approximately the number of pounds per thousand gallons of suspension. Table I also presents the percentage of solids in the filter cake removed from the filter leaf, higher numbers indicating a drier cake. The calculated yield of dried solids stated in the units of pounds per hour per square foot of filter area gives an indication of the filter area required in a plant to remove a given weight of solids.

TABLE I

| Percent solids in sludge | $CaCl_2$ added, grams/liter | CaO added, grams/liter | Percent solids in filter cake | Yield, lbs./hr./ft.$^2$ |
|---|---|---|---|---|
| 1.58 | 2.0 | 4.0 | 15.33 | 0.64 |
| 1.58 | 0.5 | 7.0 | 18.10 | 0.64 |
| 1.37 | 1.0 | 8.0 | 23.74 | 0.57 |
| 1.37 | 0.5 | 9.0 | 23.23 | 0.58 |
| 1.37 | 3.0 | 6.0 | 20.37 | 0.59 |
| 1.37 | 1.5 | 7.0 | 22.97 | 0.56 |
| 1.37 | 2.5 | 7.0 | 21.93 | 0.65 |
| 1.37 | 1.5 | 9.0 | 23.86 | 0.69 |
| 1.37 | 0.5 | 11.0 | 24.97 | 0.63 |
| 1.34 | 0.5 | 7.0 | 21.68 | 0.53 |
| 1.34 | 1.0 | 10.0 | 30.22 | 0.63 |
| 1.48 | 1.0 | 10.0 | 24.4 | 0.67 |
| 1.15 | 0.5 | 10.2 | 24.89 | 0.68 |
| 1.367 | 1.25 | 10.0 | 24.81 | 0.64 |
| 1.367 | 0.85 | 12.0 | 28.05 | 0.66 |

| Percent solids in sludge | $FeCl_3$ added, grams/liters | CaO added, grams/liters | Percent solids in filter cake | Yield, lbs./hr./ft.$^2$ |
|---|---|---|---|---|
| 1.58 | 1.0 | 4.0 | 16.20 | 0.83 |
| 1.58 | 0.75 | 3.0 | 13.89 | 0.78 |
| 1.37 | 1.25 | 5.0 | 18.59 | 1.09 |
| 1.47 | .75 | 3.0 | 15.08 | 0.72 |
| 1.54 | 1.25 | 5.0 | 17.34 | 1.03 |
| 1.34 | 1.5 | 6.0 | 19.7 | 1.18 |
| 1.48 | 1.5 | 6.0 | 16.71 | 1.26 |
| 1.15 | 2.05 | 4.2 | 16.17 | 1.00 |
| 1.15 | 1.35 | 5.3 | 19.73 | 1.37 |
| 1.367 | .75 | 3.0 | 15.34 | 0.66 |
| 1.367 | 1.5 | 6.0 | 16.58 | 0.97 |

The data in Table I illustrates that the percentage of dry solids in the filter cake is, in general, substantially higher for activated sludge flocculated by additions of calcium chloride and slaked lime than for activated sludge flocculated with the conventional ferric chloride and slaked lime process. Even in those specific examples when the yield is better for the ferric chloride additive, the added cost of this material relative to calcium chloride makes the latter more economical. Filter yield is somewhat lower for calcium chloride and lime additions than for ferric chloride and lime additions. It is significant that the filter cake is appreciably drier for the calcium chloride and lime combination since this leads to substantial economies in incineration of the resultant filter cake. As pointed out hereinabove, 1% increase in organic solids content gives a flame temperature about 150° F. higher. Furthermore the resultant filter cake when incinerated yields a product containing substantial quantities of CaO which is substantially free of iron and is readily recycled in the process for treating activated sludge.

In another series of tests unelutriated digested sludge was flocculated according to the principles of this invention and filtered. The tests were conducted in the same manner and with the same additives as for activated sludge. Additions of calcium chloride and calcium oxide were compared with the standard ferric chloride and calcium oxide treatment. The results of this series of tests are set forth in Table II in substantially the same manner as set forth in Table I for activated sludge.

TABLE II

| Percent solids in sludge | CaCl₂, grams/liters | CaO added, grams/liter | Percent solids in filter cake | Yield, lbs./hr./ft.² |
|---|---|---|---|---|
| 2.42 | 8 | 16 | 32.87 | 1.03 |
| 2.42 | 15 | 25 | 32.44 | .90 |
| 2.42 | 4 | 13 | 32.20 | .74 |
| 2.21 | 4 | 16 | 32.61 | .83 |
| 2.21 | 3 | 9 | 32.05 | .53 |
| 2.29 | 1.75 | 8 | 30.66 | .41 |
| 2.29 | 7.2 | 10.7 | 27.97 | .81 |
| 2.16 | 1.5 | 13 | 30.29 | .72 |
| 2.16 | 1.5 | 11 | 32.03 | .63 |

| Percent solids in sludge | FeCl₂ added, grams/liter | CaO added, grams/liter | Solids in filter cake | Yield, lbs./hr./ft.² |
|---|---|---|---|---|
| 2.42 | 4 | 16 | 22.43 | 1.46 |
| 2.42 | 2 | 8 | 23.94 | 0.54 |
| 2.21 | 2.5 | 9 | 26.05 | 0.94 |
| 2.29 | 3.1 | 12.6 | 22.94 | 1.35 |
| 2.29 | 2.5 | 10 | 19.75 | 1.53 |
| 2.16 | 2.0 | 8 | 26.02 | 0.29 |
| 2.16 | 2.5 | 10 | 20.88 | 1.60 |

It can be seen from Table II that the percentage of dry solids in the filter cake is significantly higher for digested sludge flocculated with calcium chloride and slaked lime than with ferric chloride and slaked lime. The yield of dry solids in the filter cake is higher for the ferric chloride and lime treated material. In addition to the advantages of a drier cake in reducing the cost of incineration the incinerated digested sludge provided in the practice of this invention contains a substantial quantity of CaO which is readily recycled without contamination with iron.

It is to be understood that the above described examples are merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. In an activated sludge waste treatment process the improvement comprising:
   flocculating sludge by the sequential steps of mixing a first flocculating agent in the sludge and sequentially thereafter mixing a second flocculating agent in the sludge, said first and second flocculating agents being selected from the class consisting of calcium chloride and calcium oxide whereby solids in the sludge are substantially instantaneously flocculated, said first flocculating agent being one member of the class and said second flocculating agent being the other member of the class;
   separating the flocculated solids from the liquid; and
   recovering usable calcium oxide from the separated solids.

2. A process as defined in claim 1 wherein the recovering step comprises:
   heating the flocculated solids to a temperature at least high enough to decompose calcium hydroxide to calcium oxide; and
   recycling at least a portion of the calcium oxide to the flocculating step, thereby effecting operating economies.

3. A process as defined in claim 2 further comprising: purging a portion of the calcium oxide for minimizing buildup of undesirable materials in the process.

4. A process as defined in claim 2 wherein the sludge comprises activated sludge.

5. A process as defined in claim 2 wherein the sludge comprises digested sludge.

6. A process as defined in claim 2 wherein the calcium chloride is added in the range of from about 5 to 40 pounds of calcium chloride per 1,000 gallons of suspension per one percent of solids suspended therein.

7. A process as defined in claim 2 wherein said first flocculating agent comprises calcium chloride and said second flocculating agent comprises hydrated calcium oxide.

8. A process as defined in claim 2 wherein the hydrated calcium oxide is added in the range of from about 30 to 200 pounds of calcium oxide per 1,000 gallons of suspension per one percent of solids suspended therein.

9. A process as defined in claim 8 wherein the calcium chloride is added in the range of from about 5 to 40 pounds of calcium chloride per 1,000 gallons of suspension per one percent of solids suspended therein.

10. A process as defined in claim 9 wherein said first flocculating agent comprises calcium chloride and said second flocculating agent comprises hydrated calcium oxide.

11. A process as defined in claim 10 wherein the sludge includes ash and further comprising the step of:
   purging a portion of the calcium oxide from said heating step for removing a portion of the ash from the recycling step and minimizing buildup of undesirable materials.

12. A process for waste treatment comprising:
   aerobically converting organic wastes to activated sludge;
   separating a portion of water from the activated sludge;
   mixing calcium chloride with a portion of sludge in the range of from about 5 to 40 pounds of calcium chloride per 1,000 gallons of sludge per one percent of solids suspended therein;
   sequentially thereafter mixing hydrated calcium oxide with the portion of sludge in the range of from 30 to 200 pounds of calcium oxide per 1,000 gallons of sludge per one percent of solids suspended therein, whereby solids in the sludge are substantially instantaneously flocculated;
   filtering the sludge for separating water from the flocculated solids;
   incinerating the filtered solids at a temperature at least high enough to decompose calcium hydroxide to calcium oxide;
   purging a portion of the calcium oxide for minimizing buildup of undesirable materials;
   comminuting another portion of the calcium oxide; and
   recycling the comminuted calcium oxide to the second mixing step for causing flocculation and effecting operating economies.

13. A process as defined in claim 12 further comprising the step of:
   anaerobically digesting the activated sludge to form digested sludge prior to said mixing steps.

References Cited

UNITED STATES PATENTS

| 1,876,123 | 9/1932 | Wright | 210—152 |
| 2,044,582 | 6/1936 | Lykken et al. | 210—45 |
| 2,044,584 | 6/1936 | Rankin | 210—45 |
| 2,072,154 | 3/1937 | Butterfield | 210—45 |
| 2,359,748 | 10/1944 | Clemens | 210—45 |
| 3,279,603 | 10/1966 | Busse | 210—67 |
| 3,342,731 | 9/1967 | Baumann et al. | 210—45 |
| 3,345,288 | 10/1967 | Sontheimer | 210—10 |

FOREIGN PATENTS 3,576  1876  Great Britain.

MICHAEL E. ROGERS, *Primary Examiner.*

U.S. Cl. X.R.

210—10, 18, 45, 53, 67